Nov. 28, 1939.  A. D. ALBERO  2,181,529

PRESSING MACHINE STEAM VALVE

Filed July 27, 1937

INVENTOR.
Andrew D. Albero
BY
Frank Kahn
ATTORNEY.

Patented Nov. 28, 1939

2,181,529

UNITED STATES PATENT OFFICE 2,181,529

PRESSING MACHINE STEAM VALVE

Andrew D. Albero, Delaware Gardens, N. J., assignor of one-half to Irving M. Falk, Philadelphia, Pa.

Application July 27, 1937, Serial No. 155,851

1 Claim. (Cl. 251—78)

My invention relates to valves, and, more particularly, relates to valves for controlling the steam supply to steam pressing devices.

Heretofore, pressing machine steam valves have been of the type which are operated by being forced into contact with or retracted from a seat surrounding the port desired to be closed or opened. This type of valve is generally provided with a gasket or packing whose function is to insure a pressure tight closure. Although the sealing function might be relatively efficient when the gasket is new, it is the general experience that the gasket or packing soon becomes worn, causing the valve to leak.

The primary object of my invention is to produce a valve in which this defect is overcome.

Another object of my invention is to provide a manually operable slide valve for pressing machines.

A further object of my invention is to produce a valve of extreme simplicity which may be used on steam pressing machines and flat-irons.

Still another object of my invention is to provide a pressing machine steam valve of simple, durable and inexpensive construction.

With these and other objects in view which will become apparent as the description proceeds, my invention consists essentially of a valve chamber provided with an inlet and an outlet port, a slide valve adapted, when in one position, to provide communication between the ports and in another position to prevent such communication, and means to control the position of said valve.

The invention, both as to details of construction and combination of parts, will best be understood from the following description of a specific embodiment which I illustrate as an example, when read in connection with the accompanying drawing, in which.

Figure 1:
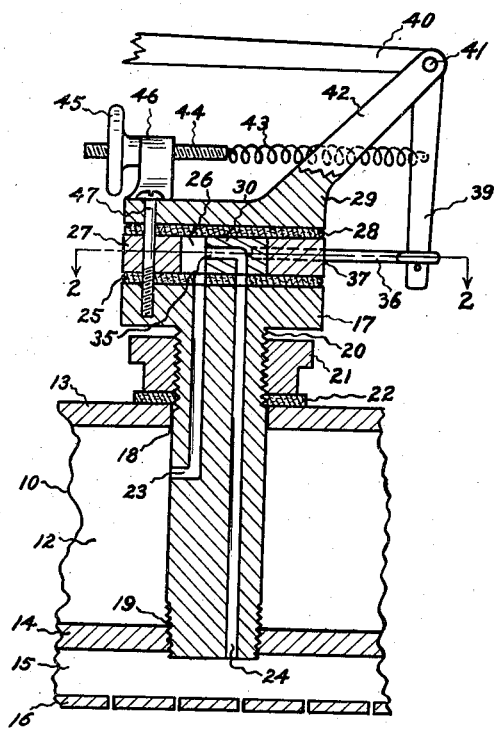
Fig. 1 is an elevation, partly in section, of my improved valve showing it used in connection with the head of a pressing machine.

Referring now to the drawing, I have shown in Fig. 1 a pressing machine head 10 provided with a steam chamber 12 enclosed within an upper wall 13 and a lower wall 14, and a distributor chamber 15 between the wall 14 and an outer perforate wall 16. A valve casing 17 extends through the chamber 12 through a bore 18 in the wall 13 and threadedly engages a pipe-tapped opening 19 in the wall 14. Above the wall 13, the casing 17 is provided with threads 20 which are engaged by a nut 21 which may be turned down over a gasket 22 to seal the chamber 12. Within the casing 17 are provided an inlet passage 23 and an outlet passage 24 communicating at their lower ends with chambers 12 and 15, respectively. At their upper ends, passages 23 and 24 continue through a gasket 25 which comprises the floor and valve seat of a valve chamber 26 formed within a housing member 27 and a gasket 28 reinforced by a cover member 29.

A slide valve 30 provided with a passage 35 therein is reciprocable within the chamber 26 by means of a valve stem 36 passing through an opening 37 in the member 27 and being screw-threaded into the valve 30. Stem 36 is provided with a loop 38 at the outer end, wherein is engaged one end 39 of a manually-operable control bellcrank lever 40 pivoted at a point 41 on a supporting arm 42 carried by the member 29. A spring 43 is attached to the end 39 of the control lever 40, its tension being regulated by an adjusting screw 44 and nut 45 cooperating with a support 46 carried by the member 29. Screws 47 pass through suitable openings in members 27 and 29 and gaskets 25 and 28 and screw-threadedly engage casing 17 to secure a steam tight arrangement.

The operation of this device is as follows: Assume that steam has been admitted by suitable means (not illustrated) into chamber 12. To operate the pressing machine and admit steam into the distributor 15, control lever 40 is operated, moving the lever end 39 to the position illustrated in Fig. 1 against the tension of spring 43. The valve stem 36 and the valve 30 are moved to the right to the position shown, permitting steam to traverse passages 23, 35 and 24 to the chamber 15.

Although any suitable type of material may be used for gaskets 25 and 28, it has been my experience that fiber gaskets are preferable because they soon form a smooth shiny surface which needs no lubrication.

Disassembly of the valve mechanism is accomplished by merely removing the screws 47. Adjustment of compression of the slide-valve 27 between gaskets 25 and 28 is also by means of screws 47.

Figure 2:
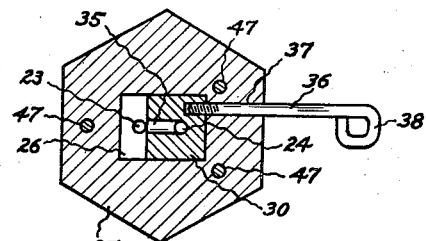
Fig. 2 is a section on the line 2—2 of Fig. 1.
Figure 3:
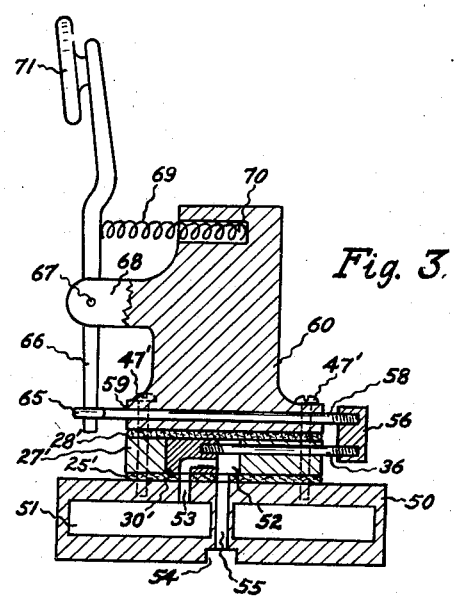
Fig. 3 is a side elevation, partly in section, of my valve as used on a flat-iron.
Figure 4:
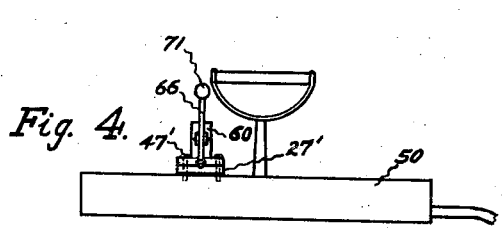
Fig. 4 is a front elevation of the flat-iron of Fig. 3.

Figs. 3 and 4 show a flat-iron 49 in which the steam is controlled by a valve 50 similar in operation to that of Figs. 1 and 2. A valve chamber 52 communicates with a steam chamber 51 by means of a passage 53, and with an external channel 54 by means of a passage 55. A valve chamber is formed by gaskets 25' and 28' and a valve housing 27'. A valve 30' is reciprocated by a valve stem 36' which passes through and projects rearwardly of housing 27' and is screw-threaded externally thereof into a tie member 56 into which is also screw-threaded a rod 58. The rod 58 passes horizontally completely through a top member 60 to the front of the iron by means of an opening 59, and at its front end is provided with a loop 65. An operating lever 66 is pivoted at a point 67 on a supporting arm 68 carried by the member 60, and has its lower end extending into the loop 65. A compression spring 69 lies partly in a recess 70 in member 60 and exerts pressure on the upper part of lever 66, tending to force said lever to the left. Screws 47' secure the parts in proper relation and permit ready disassembly and adjustment of the valve.

Thumb pressure on a knob 71 on the lever 66 permits operation of the valve mechanism from the normally closed position to the open position illustrated in Fig. 3, in which the rod 59 has been moved to the left, carrying with it the stem 36' and the valve 30'.

Figure 5:
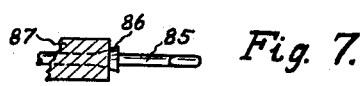
Fig. 5 is a fragmentary side elevation, partly in section of a modification of the flat-iron construction shown in Fig. 3.

An alternate construction for the flat-iron mechanism is shown in Fig. 5, and is similar in construction to the valve of Fig. 3 except that the rod 58 is dispensed with and a valve stem 36'' enters from the front of the iron through a valve housing 27''. Although the construction of Fig. 5 is simpler, the construction shown in Fig. 3 has the advantage that if steam leaks through the valve-stem opening in the valve housing, it issues toward the rear of the iron and not toward the operator as it would in the device of Fig. 5. When new, the valve stem fit is snug and there should be no leaks, but when wear occurs there is the possibility of steam leaks. This condition is minimized in the valve construction of Fig. 1, where, in the open position (as illustrated) the valve 30 itself seals the opening 37. In Fig. 3, leakage due to a worn valve stem might occur when the valve is opened (as illustrated). In Fig. 5 the valve stem opening is sealed by the valve when the valve is open (as illustrated).

Figure 6:
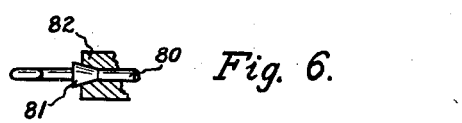
Fig. 6 is a fragmentary section of the valve of my invention showing a method of providing a valve stem seal.
Figure 7:
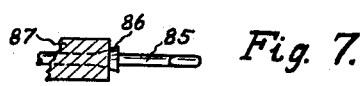
Fig. 7 is a fragmentary section of the valve of my invention showing another valve stem seal.

To overcome the leakage effects of worn valve stems, they may be constructed with conical sections cofitting with complementary openings in the valve housings. Such a construction is shown in Fig. 6, where a valve stem 80 is provided with a conical section 81 and a cooperating valve housing 82 is shown in fragmentary section. This type of construction is for the mechanism of Fig. 5, and would provide a positive seal for the closed valve position. Similarly, Fig. 7 shows a valve stem 85 with a conical section 86 and a cooperating housing 87. This construction would provide a positive closed-valve seal for the mechanism of Fig. 1 and an open-valve seal for the mechanism of Fig. 3.

Figure 8:
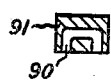
Fig. 8 is a sectional side elevation showing a modification of my slide valve.

Instead of the L passages in the valves of Figs. 1, 2, 3, and 5, a U passage 90 as represented in the valve 91 of Fig. 8, or a similar reentrant passage may be employed in my valves.

Although the invention has been described in considerable detail, such description is intended as illustrative rather than limiting, as numerous embodiments will be apparent to those skilled in the art. My invention, therefore, is not intended to be limited except insofar as is necessitated by the prior art or the spirit of the appended claim.

I claim:

A valve for steam pressing devices including a bottom casing member, an intermediate casing member having an opening therethrough forming a valve chamber, a top casing member, a bottom gasket between said bottom member and said intermediate member, said bottom gasket completely covering and extending beyond the margins of the opening in said intermediate member and said bottom member and said bottom gasket having an inlet port and an outlet port opening into the valve chamber, a top gasket between said intermediate member and said top member, said top gasket completely covering and extending beyond the margins of the opening in said intermediate member, a slide-valve reciprocable within said chamber and constructed and arranged such that in one position of said slide-valve said ports are in communication and in another position communication is prevented, means to control the position of said slide-valve, and means to compress said gaskets and said intermediate member between the bottom and top members, said slide-valve being constructed and arranged to be under compression between said gaskets.

ANDREW D. ALBERO.